United States Patent
Guo et al.

(10) Patent No.: US 11,876,384 B2
(45) Date of Patent: Jan. 16, 2024

(54) WIRELESS POWER TRANSFER DEVICE

(71) Applicant: OTIS ELEVATOR COMPANY, Farmington, CT (US)

(72) Inventors: Ben Guo, West Hartford, MI (US); Antonio Martins, Vernon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/122,133

(22) Filed: Dec. 15, 2020

(65) Prior Publication Data
US 2022/0190645 A1 Jun. 16, 2022

(51) Int. Cl.
*H02J 50/12* (2016.01)
*H02J 50/70* (2016.01)
*H04B 5/00* (2006.01)

(52) U.S. Cl.
CPC .............. *H02J 50/12* (2016.02); *H02J 50/70* (2016.02); *H04B 5/0037* (2013.01); *H04B 5/0093* (2013.01)

(58) Field of Classification Search
CPC ........ H02J 50/12; H02J 50/70; H04B 5/0093; H04B 5/0037
See application file for complete search history.

(56) References Cited

U.S. PATENT DOCUMENTS

| | | | | |
|---|---|---|---|---|
| 6,157,193 A * | 12/2000 | Renz | ....................... | A61B 5/055 324/318 |
| 7,136,028 B2 * | 11/2006 | Ramprasad | .......... | H01Q 15/008 343/909 |
| 7,528,788 B2 * | 5/2009 | Dunn | .................... | H01Q 15/006 343/754 |
| 9,570,222 B2 * | 2/2017 | Gupta | ....................... | H01G 5/38 |
| 2006/0044211 A1 * | 3/2006 | Ramprasad | .............. | H01Q 1/22 343/909 |
| 2011/0128013 A1 * | 6/2011 | Werle | ................. | G01R 31/1227 324/543 |
| 2012/0098484 A1 * | 4/2012 | Cheng | ..................... | H02J 50/12 320/108 |
| 2012/0326520 A1 * | 12/2012 | Konya | ................. | H04B 5/0031 307/104 |
| 2013/0170675 A1 * | 7/2013 | Saint Vincent | .......... | H04R 3/00 381/190 |
| 2014/0091758 A1 * | 4/2014 | Hidaka | ................ | H04B 5/0037 320/108 |
| 2014/0252867 A1 * | 9/2014 | Ogawa | ..................... | H02J 7/025 307/104 |
| 2014/0354377 A1 * | 12/2014 | Gupta | ...................... | H01G 4/38 336/206 |

(Continued)

FOREIGN PATENT DOCUMENTS

KR 20150065428 A * 6/2015 ......... H01F 27/2885

*Primary Examiner* — Daniel Cavallari
*Assistant Examiner* — Brian K Baxter
(74) *Attorney, Agent, or Firm* — Carlson, Gaskey & Olds, P.C.

(57) ABSTRACT

An illustrative example embodiment of a wireless power transfer device includes an inductor panel and a capacitor panel adjacent the inductor panel. The capacitor panel includes a first conductive plate adjacent one side of the inductor panel, a dielectric layer adjacent the first conductive plate, and a second conductive plate adjacent the dielectric layer on an opposite side of the dielectric layer from the first conductive plate.

18 Claims, 3 Drawing Sheets

(56) References Cited

U.S. PATENT DOCUMENTS

| | | | |
|---|---|---|---|
| 2016/0111889 A1* | 4/2016 | Jeong | H02J 7/0042 |
| | | | 320/108 |
| 2018/0286550 A1* | 10/2018 | Nakahata | H01F 38/14 |
| 2019/0148065 A1* | 5/2019 | Naruse | H01F 3/14 |
| | | | 307/104 |
| 2019/0272950 A1* | 9/2019 | Maruthamuthu | H01F 27/40 |
| 2021/0193382 A1* | 6/2021 | Canete Cabeza | H01F 27/085 |

\* cited by examiner

WIRELESS POWER TRANSFER DEVICE

BACKGROUND

Wireless power transfer devices typically rely on an inductive linkage between two inductors to transfer energy from a primary side to a secondary side. Devices having a resonant topology typically include a capacitor associated with each inductor. The inductor and capacitor form a LC series resonator. While such arrangements have proven useful, they present various challenges.

For example, high power wireless transfer that involves high voltage usually requires some accommodation for dissipating heat. Electromagnet shielding is also usually required to reduce electromagnetic noise or interference associated with the radiated energy of the magnetic field of the primary or transmitter coil. The electromagnetic field of the primary coil is desired for a wireless coupling with the secondary coil but radiation not involved in the coupling that causes electromagnetic interference (EMI) with other devices or components is undesired. The way in which the capacitor and inductor are arranged in typical resonant wireless power transfer topologies tends to increase the amount of EMI rather than reduce it.

SUMMARY

An illustrative example embodiment of a wireless power transfer device includes an inductor panel and a capacitor panel adjacent the inductor panel. The capacitor panel includes a first conductive plate adjacent one side of the inductor panel, a dielectric layer adjacent the first conductive plate, and a second conductive plate adjacent the dielectric layer on an opposite side of the dielectric layer from the first conductive plate.

In addition to one or more of the features described above, or as an alternative, the inductor panel includes a conductive coil and a magnetic core adjacent the conductive coil.

In addition to one or more of the features described above, or as an alternative, the conductive coil comprises at least one conductor arranged in a single layer and the magnetic core is arranged in a single layer.

In addition to one or more of the features described above, or as an alternative, the conductive coil comprises a single conductor having two ends and the magnetic core comprises a plurality of core segments.

In addition to one or more of the features described above, or as an alternative, the magnetic core includes a window through the magnetic core, the wireless power transfer device includes an electrically conductive connection between the first conductive plate and one end of the single conductor, and the electrically conductive connection is situated at least partially within the window.

In addition to one or more of the features described above, or as an alternative, an electrically isolating layer is included between the magnetic core and the conductive coil.

In addition to one or more of the features described above, or as an alternative, the inductor panel includes a coiled conductor arranged in a first layer and a magnetic core arranged in a second layer adjacent the first layer and the inductor panel includes a coil support at least partially surrounding the coiled conductor.

In addition to one or more of the features described above, or as an alternative, the coil support comprises a resin material.

In addition to one or more of the features described above, or as an alternative, the first conductive plate is configured as an electromagnetic shield that reduces radiation of a magnetic field of the inductor panel.

In addition to one or more of the features described above, or as an alternative, the inductor panel and the capacitor panel define a package and an electrically conductive connection is between the inductor panel and the first conductive plate within the package.

In addition to one or more of the features described above, or as an alternative, the inductor panel and the capacitor panel establish a first LC series resonator and a second LC series resonator includes another inductor panel and another capacitor panel.

An illustrative example embodiment of a method of making a wireless power transfer device includes forming an inductor panel and situating a capacitor panel adjacent the inductor panel. The capacitor panel includes a first conductive plate adjacent one side of the inductor panel, a dielectric layer adjacent the first conductive plate, and a second conductive plate adjacent the dielectric layer on an opposite of the dielectric layer from the first conductive plate.

In addition to one or more of the features described above, or as an alternative, forming the inductor panel comprises arranging at least one conductor to form a conductive coil and situating a magnetic core adjacent the conductive coil.

In addition to one or more of the features described above, or as an alternative, forming the inductor panel comprises arranging the conductive coil in a single layer and arranging the magnetic core in a single layer.

In addition to one or more of the features described above, or as an alternative, the method includes establishing a window through the magnetic core and establishing an electrically conductive connection between the first conductive plate and one end of the single conductor at least partially within the window.

In addition to one or more of the features described above, or as an alternative, forming the inductor panel comprises arranging a coiled conductor in a first layer, arranging a magnetic core in a second layer adjacent the first layer, and at least partially surrounding the coiled conductor by a coil support.

In addition to one or more of the features described above, or as an alternative, the method includes forming the coil support of a resin material.

In addition to one or more of the features described above, or as an alternative, the method includes placing an electrically isolating layer between the inductor panel and the first conductive plate.

In addition to one or more of the features described above, or as an alternative, the method includes configuring the first conductive plate as an electromagnetic shield that reduces radiation of a magnetic field of the inductor panel.

In addition to one or more of the features described above, or as an alternative, the method includes assembling the inductor panel and the capacitor panel as a package and including an electrically conductive connection between the inductor panel and the first conductive plate within the package.

The various features and advantages of at least one disclosed example embodiment will become apparent to those skilled in the art from the following detailed description. The drawings that accompany the detailed description can be briefly described as follows.

DETAILED DESCRIPTION

Wireless power transfer devices including features like those of the example embodiments described below have a unique LC series resonator configuration. A compact, integrated package provides the wireless coupling operation of a LC series resonator while reducing or minimizing electromagnetic noise and dissipating heat.

Figure 1:
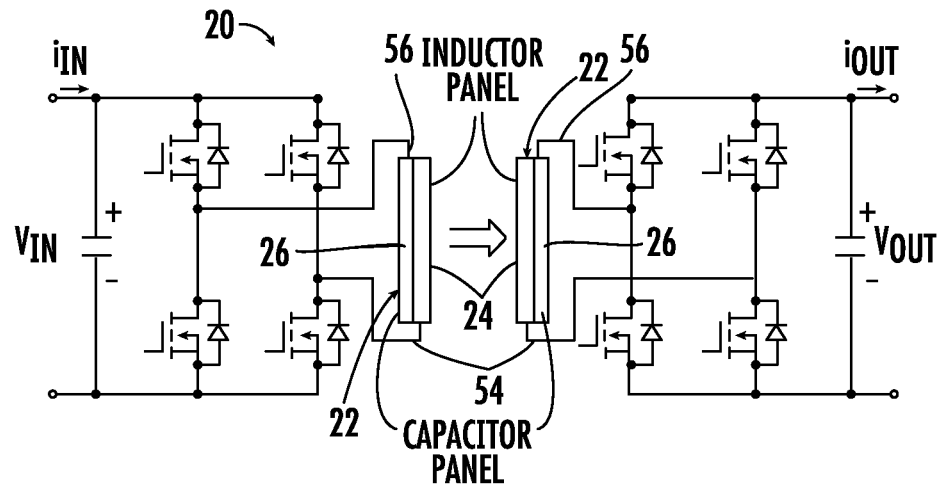
FIG. 1 schematically illustrates a wireless power transfer device.

FIG. 1 schematically illustrates a wireless power transfer device 20 that is useful for a variety of situations. In some embodiments, the wireless power transfer device 20 is used for high power transfer that involves high voltage. One example use for such a power transfer device is within an elevator system.

The wireless power transfer device 20 includes a primary side (on the left in the drawing) that transfers power to a secondary side (on the right in the drawing). Each of the primary side and the secondary side include a LC series resonator 22 including an inductor panel 24 that establishes the inductive coupling between the primary and secondary side. A capacitor panel 26 is situated adjacent each inductor panel 24.

Figure 2:
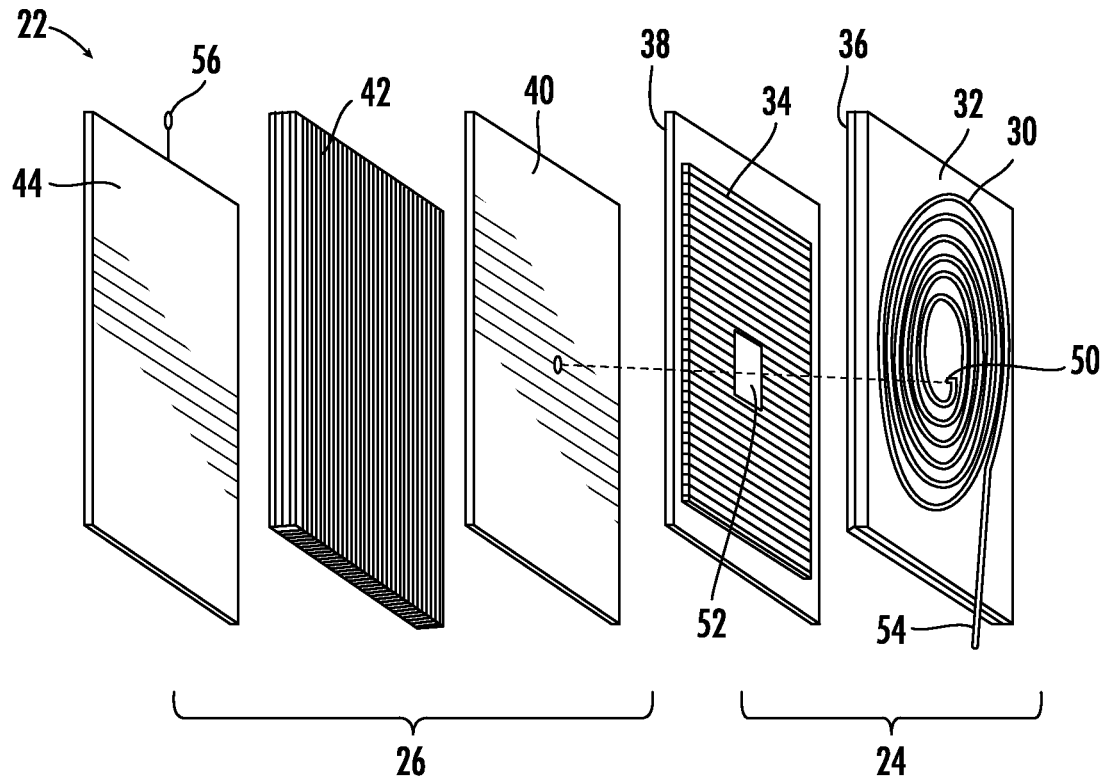
FIG. 2 is an exploded view schematically illustrating selected features of a LC series resonator configuration of the embodiment of FIG. 1.

FIG. 2 is an exploded view schematically illustrating an example configuration of a LC series resonator 22. The inductor panel in this example includes a conductive coil 30 arranged in a single layer. In this example embodiment, the conductive coil 30 is formed of a single conductor. The conductive coil 30 is at least partially secured to a coil support 32. The conductive coil 30 and the coil support 32 can be considered one layer of the example inductor panel 24. In some example embodiments, the coil support 32 comprises a resin material that is cast or molded onto or against a side of the coil 30.

The inductor panel 24 includes a magnetic core 34 situated adjacent the conductive coil 30. A relatively thin electrically isolating layer 36 is situated between the magnetic core 34 and the coil 30. Another electrically isolating layer 38 is situated on an opposite side of the magnetic core 34.

While the example inductor panel 24 includes a magnetic core, which is useful for high power wireless power transfer, some embodiments include an inductor panel without a magnetic core. The magnetic core 34 is arranged in a single layer.

The example capacitor panel 26 of FIG. 2 includes a first conductive plate 40 situated adjacent one side of the inductor panel 24. The first conductive plate 40 is received against the isolating layer 38 in this example. A dielectric layer 42 is situated adjacent the first conductive plate 40. A second conductive plate 44 is situated adjacent to the dielectric layer 42 on an opposite side of the dielectric layer 42 from the first conductive plate 40. The conductive plates 40 and 44 and the dielectric later 42 establish a capacitor.

The first conductive plate 40 serves several functions in this example embodiment. The first conductive plate 40 is one plate of the capacitor. The first conductive plate adjacent the inductor panel 24 also acts as a shield for EMI by blocking stray or undesired electromagnetic radiation that is not needed or used for the wireless power transfer coupling.

Another function of the example first conductive plate 40 is that the size, geometry and location of the plate 40 facilitates dissipating heat from the inductor panel 24.

The conductive coil 30 includes one end 50 that is electrically coupled with the first conductive plate 40. The electrical connection is established at least partially through a window 52 through the magnetic core 34. An opposite end 54 of the conductive coil 30 is connected with another portion of the wireless power transfer device 20 as schematically shown in FIG. 1, for example. The capacitor panel 26 includes a lead 56 electrically coupling the capacitor with another portion of the wireless power transfer device 20.

A LC series resonator configuration like that shown in the drawings integrates the inductive and capacitive capabilities of the LC series resonator 22 into a single package that provides a compact design. One feature of the example arrangement is that there is a reduced or minimized connection distance between the inductor and capacitor. Reducing this connection distance avoids shifting the resonant frequency of the LC series resonator 22. Additionally, the reduced connection distance contributes to reducing or minimizing the radiated EMI of the inductor panel 24.

The illustrated example configuration is useful for high power conditions where voltages on the order of 400 volts and power on the order of 10 kilowatts can effectively be wirelessly transferred while dissipating heat and protecting against undesired EMI or noise all within a compact, integrated package.

Figure 3:
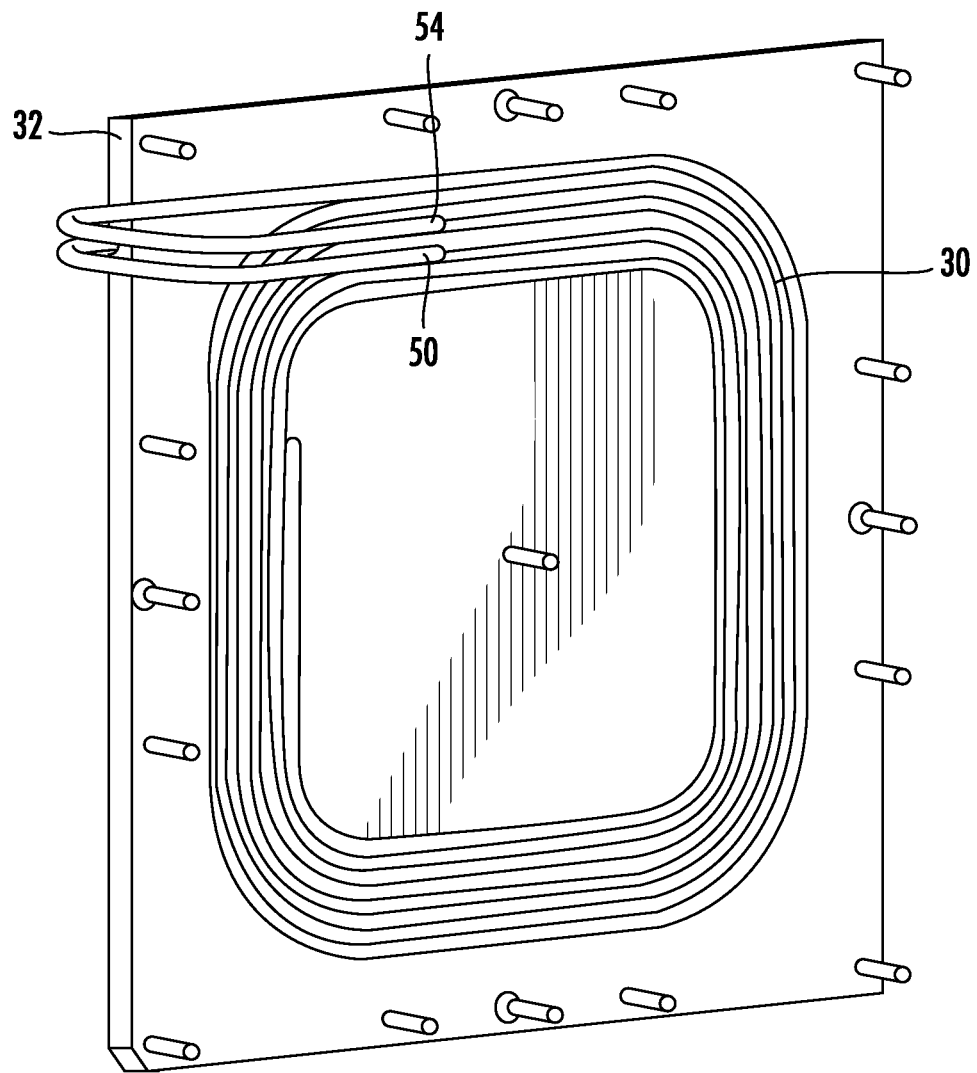
FIG. 3 schematically illustrates an inductor coil configuration according to an example embodiment.

FIG. 3 schematically illustrates another configuration of a conductive coil 30 and a coil support layer 32. The conductive coil 30 in this example comprises a single conductor having two ends 50 and 54. The coil is arranged in a single layer and is at least partially embedded in the material of the coil support 32, which is a non-conductive resin in this example.

Figure 4:
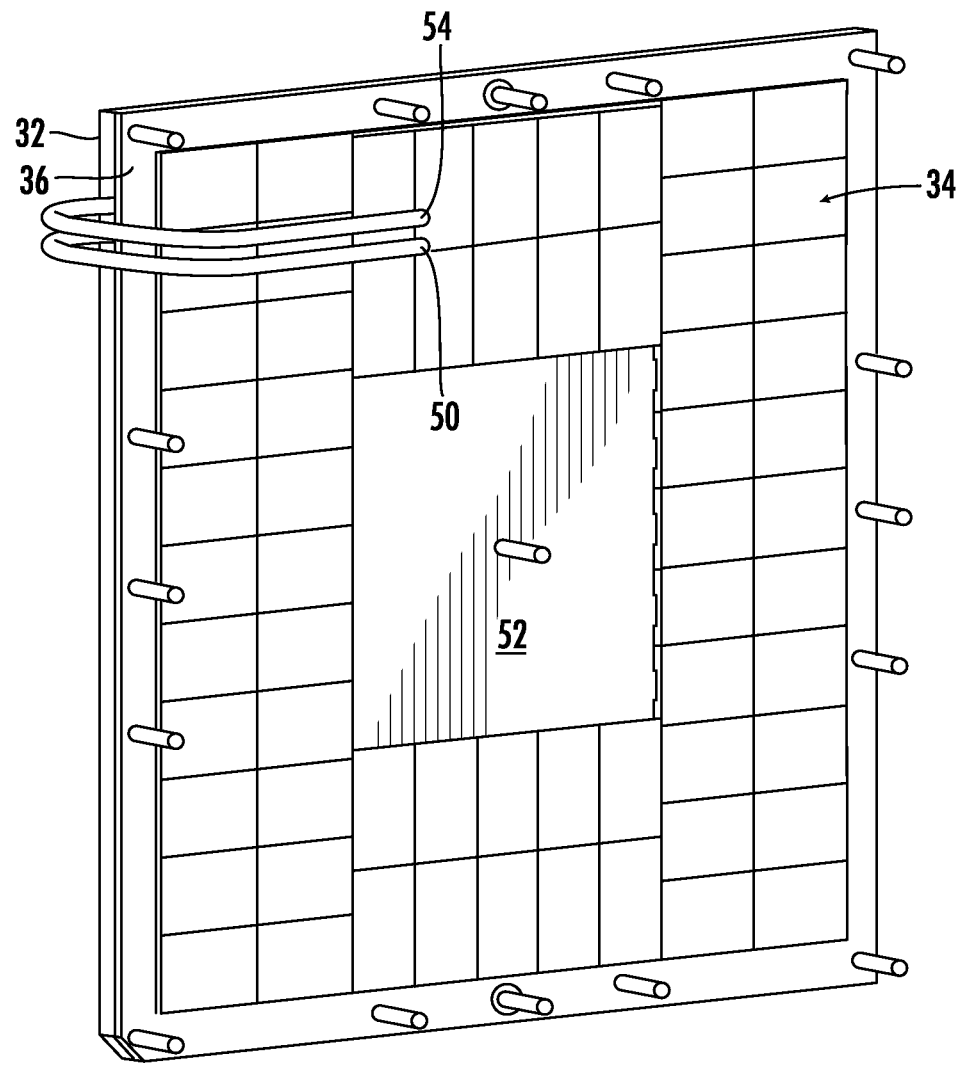
FIG. 4 schematically illustrates a magnetic core configuration adjacent the inductor coil of FIG. 3.

FIG. 4 illustrates an example arrangement of an electrically isolating layer 36 received against the coil support 32 between the conductive coil 30 and the magnetic core 34. In this example, the magnetic core 34 includes a plurality of ferrite plates that are arranged in a single layer including a window 52 through which the electrical connection between the conductive coil 30 and the first conductive plate 40 of the capacitor panel 26 will be made. Having that electrical coupling extend over the very small distance between the single layer of the conductive coil 30 and the first conductive plate 40 and keeping that electrical connection within the package of the LC series resonator 22 contributes to reducing any EMI or noise that would otherwise be associated with the connection between the inductor and the capacitor of the LC series resonator 22.

The compact, integrated arrangement of an inductor panel 24 and capacitor panel 26 provides a LC series resonator that is useful for a variety of wireless power transfer devices including those that are intended for high power, high voltage conditions. The way in which the various layers of the panels are arranged renders the LC series resonator better than typical circuitry in several respects. The compact arrangement includes using at least one of the plates of the capacitor as an electromagnetic shield. The material and geometry of the plate also dissipates heat.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A wireless power transfer device, comprising:
an inductor panel including a coiled conductor arranged in a first layer and a magnetic core arranged in a second layer adjacent the first layer, the magnetic core including an open window through the magnetic core;
a capacitor panel adjacent the inductor panel, the capacitor panel including
a first conductive plate adjacent one side of the inductor panel,
a dielectric layer adjacent the first conductive plate, and
a second conductive plate adjacent the dielectric layer on an opposite side of the dielectric layer from the first conductive plate; and
an electrically conductive connection between the first conductive plate and one end of the coiled conductor, wherein the electrically conductive connection is situated at least partially within the window.

2. The wireless power transfer device of claim 1, wherein the conductive coil in the first layer is arranged entirely in a single layer.

3. The wireless power transfer device of claim 1, wherein the conductive coil comprises a single conductor having two ends, and
the magnetic core comprises a plurality of core segments.

4. The wireless power transfer device of claim 1, including an electrically isolating layer between the magnetic core and the conductive coil.

5. The wireless power transfer device of claim 1, wherein the inductor panel includes a coil support at least partially surrounding the coiled conductor.

6. The wireless power transfer device of claim 5, wherein the coil support comprises a resin material.

7. The wireless power transfer device of claim 1, wherein the first conductive plate is configured as an electromagnetic shield that reduces radiation of a magnetic field of the inductor panel.

8. The wireless power transfer device of claim 1, wherein the inductor panel and the capacitor panel establish a first LC series resonator and comprising a second LC series resonator including another inductor panel and another capacitor panel.

9. The wireless power transfer device of claim 1, wherein the electrically conductive connection passes through the window.

10. The wireless power transfer device of claim 9, wherein the coiled conductor is arranged around a center area and the widow is centered in alignment with the center area.

11. A method of making a wireless power transfer device, the method comprising:
forming an inductor panel including a coiled conductor arranged in a first layer and a magnetic core arranged in a second layer adjacent the first layer, the magnetic core including an open window through the magnetic core;
situating a capacitor panel adjacent the inductor panel, the capacitor panel including
a first conductive plate adjacent one side of the inductor panel,
a dielectric layer adjacent the first conductive plate, and
a second conductive plate adjacent the dielectric layer on an opposite side of the dielectric layer from the first conductive plate; and
establishing an electrically conductive connection between the first conductive plate and one end of the coiled conductor, wherein the electrically conductive connection is situated at least partially within the window.

12. The method of claim 11, wherein forming the inductor panel comprises
arranging the conductive coil in the first layer entirely in a single layer .

13. The method of claim 11, wherein forming the inductor panel comprises
at least partially surrounding the coiled conductor by a coil support.

14. The method of claim 13, including forming the coil support of a resin material.

15. The method of claim 11, including placing an electrically isolating layer between the inductor panel and the first conductive plate.

16. The method of claim 11, including configuring the first conductive plate as an electromagnetic shield that reduces radiation of a magnetic field of the inductor panel.

17. The method of claim 11, wherein the electrically conductive connection passes through the window.

18. The method of claim 17, wherein forming the inductor panel includes arranging the coiled conductor around a center area and centering the window in alignment with the center area.

* * * * *

UNITED STATES PATENT AND TRADEMARK OFFICE
CERTIFICATE OF CORRECTION

PATENT NO. : 11,876,384 B2
APPLICATION NO. : 17/122133
DATED : January 16, 2024
INVENTOR(S) : Guo et al.

It is certified that error appears in the above-identified patent and that said Letters Patent is hereby corrected as shown below:

In the Claims

Claim 1, Column 5, Line 19, "the window" should be --the open window--

Claim 2, Column 5, Line 21, "the conductive coil" should be the --the coiled conductor--

Claim 3, Column 5, Line 24, "the conductive coil" should be the --the coiled conductor--

Claim 4, Column 5, Line 29, "the conductive coil" should be the --the coiled conductor--

Claim 9, Column 5, Lines 45-56, "the window" should be --the open window--

Claim 10, Column 6, Line 3, "the widow" should be --the open window--

Claim 11, Column 6, Lines 22-23, "the window" should be --the open window--

Claim 12, Column 6, Line 26, "the conductive coil" should be the --the coiled conductor--

Claim 17, Column 6, Line 41, "the window" should be --the open window--

Claim 18, Column 6, Line 44, "the window" should be --the open window--

Signed and Sealed this
Twentieth Day of February, 2024

Katherine Kelly Vidal
*Director of the United States Patent and Trademark Office*